(12) United States Patent
Stauder et al.

(10) Patent No.: US 11,037,524 B2
(45) Date of Patent: Jun. 15, 2021

(54) COLOR GRADING INTERPOLATION METHODS AND DEVICES

(71) Applicant: INTERDIGITAL VC HOLDINGS, INC., Wilmington, DE (US)

(72) Inventors: Jurgen Stauder, Montreuil/Ille (FR); Patrick Morvan, Laille (FR); Corinne Poree, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/470,214

(22) PCT Filed: Nov. 24, 2017

(86) PCT No.: PCT/EP2017/080412
§ 371 (c)(1),
(2) Date: Jun. 15, 2019

(87) PCT Pub. No.: WO2018/108494
PCT Pub. Date: Jun. 21, 2018

(65) Prior Publication Data
US 2019/0311695 A1 Oct. 10, 2019

(30) Foreign Application Priority Data

Dec. 15, 2016 (EP) .................................... 16306696

(51) Int. Cl.
*G09G 5/02* (2006.01)
*G09G 5/00* (2006.01)
(Continued)

(52) U.S. Cl.
CPC ............. *G09G 5/026* (2013.01); *G09G 5/005* (2013.01); *G09G 5/10* (2013.01); *H04N 9/67* (2013.01);
(Continued)

(58) Field of Classification Search
CPC .... G09G 5/02; G09G 5/06; G09G 2320/0666; G09G 2320/0626; G06T 11/001
See application file for complete search history.

(56) References Cited

U.S. PATENT DOCUMENTS 5,604,610 A 2/1997 Spaulding et al.
7,822,270 B2 10/2010 Van Hoof et al.
(Continued)

FOREIGN PATENT DOCUMENTS

CN 1991969 B 5/2010
EP 3067882 9/2016
(Continued)

OTHER PUBLICATIONS

Reinhard et al., "Chapter 6—The Human Visual System and HDR Tone Mapping", in High Dynamic Range Imaging, Acquisition, Display, and Image-Based Lighting, Elsevier, Amsterdam, 2006, pp. 187-219.
(Continued)

*Primary Examiner* — Todd Buttram
(74) *Attorney, Agent, or Firm* — Invention Mine LLC (57) ABSTRACT

A method for generating a fourth color transform is disclosed, wherein said fourth color transform transforms an original picture into a target color graded version of said original picture. The method comprises obtaining a first color transform wherein said first (reference) color transform transforms said original picture into a first color graded version of said original picture; obtaining a second (reference) color transform wherein said second color transform transforms said original picture to a second color graded version of said original picture; obtaining a third (exemplary) color transform wherein said third color transform transforms said original picture to said target color graded version of said original picture; obtaining at least one interpolating parameter wherein the fourth color transform is
(Continued)

close to or representative of the third color transform (exemplary) and the fourth color transform is obtained by applying a parametric function determined by the at least one interpolating parameter to the first color transform and second color transform. In a variant, the at least one interpolating parameter is obtained by minimizing an error between the third color transform and the fourth color transform.

12 Claims, 4 Drawing Sheets

(51) Int. Cl.
    *G09G 5/10*         (2006.01)
    *H04N 9/68*         (2006.01)
    *H04N 19/30*       (2014.01)
    *H04N 19/46*       (2014.01)
    *H04N 9/67*         (2006.01)

(52) U.S. Cl.
    CPC ............... *H04N 9/68* (2013.01); *H04N 19/30* (2014.11); *H04N 19/46* (2014.11); *G09G 2340/06* (2013.01); *G09G 2340/10* (2013.01)

(56) References Cited

U.S. PATENT DOCUMENTS

| | | | |
|---|---|---|---|
| 8,154,563 B2 | 4/2012 | Park et al. | |
| 8,194,997 B2 | 6/2012 | Segall et al. | |
| 8,648,885 B2 | 2/2014 | Lee et al. | |
| 2010/0037059 A1* | 2/2010 | Sun ....................... | G06T 1/0085 713/176 |
| 2011/0222080 A1* | 9/2011 | Monga ................. | H04N 1/6025 358/1.9 |

FOREIGN PATENT DOCUMENTS

| | | | | |
|---|---|---|---|---|
| EP | 3067882 A1 * | 9/2016 | ............... | H04N 9/64 |
| WO | 2016066520 A1 | 5/2016 | | |
| WO | WO2016066520 | 5/2016 | | |

OTHER PUBLICATIONS

Morovic et al., "The Fundamentals of Gamut Mapping: A Survey", Journal of Imaging Science and Technology, vol. 45, No. 3, May/Jun. 2001, pp. 283-290.

Faridul et al., "A Survey of Color Mapping and its Applications", Eurographics 2014, Strasbourg, France, Apr. 7, 2014, pp. 1-25.

CN1991969 B, Translated "Display color adjusting method and device" May 5, 2010.

* cited by examiner

COLOR GRADING INTERPOLATION METHODS AND DEVICES

This application claims the benefit under 35 U.S.C. § 365 of International Application PCT/EP2017/080412, filed Nov. 24, 2017, which was published in accordance with PCT Article 21(2) on Jun. 21, 2018, in English, and which claims the benefit of European Patent Application No. 16306696.2, filed Dec. 15, 2016.

1. TECHNICAL FIELD

The present disclosure relates to the domain of color grading of videos for example when a transformation is applied to an original video for different viewing conditions.

2. BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In creation and distribution of pictures and videos, it is known to produce a first version of a video, called original video, for a specific original display having original viewing conditions. In the following, viewing conditions include both the display on which the content is rendered and the environment of the rendering. Thus viewing conditions can include the color gamut of the display, the maximum luminance of the display, but also ambient light falling on the display, the luminance and chromaticity of the background, the adopted white of the human eye, the viewing distance, or the temporal evolution in any of those conditions.

It is further known, that the creator of the video produces a second version of the video, called reference video, that is well adapted to be displayed on a reference display having reference viewing conditions that are different from the original viewing conditions. This reference video may be generated either by manual color grading or by color processing such as gamut mapping and tone mapping or a combination of manual color grading followed by color processing.

However such mentioned reference video is of fixed nature in the sense that it contains colors that should be shown under the reference viewing conditions. If the viewing conditions are different from reference viewing conditions, the reference video does not show up correctly. For example, images prepared for a television set in a living room should be enhanced in contrast and saturation when shown on table outside in the sun.

When additionally to the original video and the reference video, more versions are generated, such videos may require too much storing space or transmission rate in order to show the content later or at a distant place. A known solution to this problem consists in storing or transmitting a color transform, being any combination of color grading and color processing, that can derive the additional video—for example—from the reference video. Color grading and color processing can include modification of intensity, saturation, hue, contrast, in images, part of images, multiple images or in temporal image sequences. The advantage is that instead of storing/transmitting an additional video, only a color transform has to be stored/transmitted. However, these known methods still require storage and transmission of each color transform. The transmission channel may not allow transmitting additional color transforms corresponding for additional viewing conditions. The distant receiver can neither receive additional transform nor generate additional target version of a reference video. A method for generating a new color video using color transforms adapted to target viewing conditions such that these color transforms require a minimum of storage place and a low transmission rate is therefore desirable in particular when the content receiver is distant.

3. BRIEF SUMMARY

The purpose of the invention is to overcome at least one of the disadvantages of prior art by proposing a method for generating a color video adapted to target viewing conditions from existing color transforms for other viewing conditions. Indeed, a salient idea of the invention is to determine and store interpolating parameters for generating an estimation of an existing color transform from a sub-set of others existing color transforms. Such existing color transform is advantageously removed from storage, while only the sub-set of existing color transforms and the determined interpolation parameters are stored. When the estimation of the color transform using interpolation is done at a receiver distant from the production based on the sub-set of other existing color transforms and the determined interpolation parameters, the interpolation at the receiver is advantageously not blind, but guided by the existing color transform at the production used in the determination of the interpolation parameters.

According to a first aspect, a method for generating a target color graded version of an original picture from a first color transform and a second color transform is disclosed. The first color transform is applied to an original picture to generate a first color graded version of the original picture. The second color transform is applied to the original picture to generate a second color graded version of the original picture. Advantageously, the method further comprises, for instance at a receiver implementing the method, receiving at least one interpolating parameter such that a fourth color transform is obtained by applying a parametric function determined by the at least one interpolating parameter to the first color transform and the second color transform and such that the fourth color transform is close to a third color transform, the third color transform transforming the original picture into the target color graded version of the picture. Then the method comprises generating the fourth color transform by an interpolation that applies the parametric function determined by the at least one interpolating parameter to the first color transform and the second color transform; and generating the target color graded version of the original picture by applying the fourth color transform to the original picture.

According to a specific characteristic, the at least one interpolating parameter is obtained by minimizing an error between the third color transform and the fourth color transform. The minimization is for instance performed on a set of sample color values. Advantageously, the method is compliant with any method assessing that the third color transform and the fourth color transform are close, the method being algorithmic by error minimization or being manual by an operator adjustment of the parameter up to satisfying color graded images or any combination. In other words, the interpolated fourth color transform is representative of the third color transform.

According to a second aspect, a method for generating the fourth color transform is also disclosed. Advantageously, the method comprises, for instance at a production device implementing the method, obtaining the first color transform, the second color transform (references) and the third color transform (exemplary) and obtaining at least one interpolating parameter wherein the fourth color transform is close to or representative of the third color transform (exemplary) and the fourth color transform is obtained by applying a parametric function determined by the at least one interpolating parameter to the first color transform and second color transform.

According to a specific characteristic, the at least one interpolating parameter is obtained by minimizing an error between the third color transform and the fourth color transform.

According to another specific characteristic, the method further comprises calculating the fourth color transform by an interpolation that applies the parametric function determined by the at least one interpolating parameter to the first color transform and the second color transform. Advantageously, the fourth color transform is thus present either for assessment or iterative refinement of the parameters.

According to another specific characteristic, the method further comprises transmitting the first color transform, second color transform and the at least one interpolating parameters, for instance to a distant receiver.

According to another specific characteristic, the method further comprises obtaining a difference between the third color transform and the fourth color transform for a set of sample color values; and in case where the difference is above a value repeating the obtaining at least one interpolating parameter. The fourth color transform is thus iteratively refined, which is particularly well adapted in case the interpolation function is complex such as or non-linear function.

According to a third aspect, a device for generating a target color graded version of an original picture is disclosed that comprises a processor configured to obtain a first color transform and a second color transform, wherein the first color transform transforms the original picture into a first color graded version of the original picture, the second color transform transforms the original picture to a second color graded version of the original picture; to receive at least one interpolating parameter such that a fourth color transform is obtained by applying a parametric function determined by the at least one interpolating parameter to the first color transform and the second color transform, and such that the fourth color transform is close to a third color transform and the third color transform transforms the original picture into the target color graded version of the picture; to generate the fourth color transform by an interpolator that applies the parametric function determined by the at least one interpolation parameter to the first color transform and the second color transform; and to generate the target color graded version of the original picture by applying the fourth color transform to the original picture.

In a variant, a device is disclosed that comprises means for obtaining a first color transform and a second color transform, means for receiving at least one interpolating parameter and interpolation means for generating the fourth color transform by applying the parametric function determined by the at least one interpolation parameter to the first color transform and the second color transform; and means for generating the target color graded version of the original picture by applying the fourth color transform to the original picture.

According to a specific embodiment, the device belongs to a set comprising:
 a mobile device;
 a communication device;
 a game device;
 a set top box;
 a TV set;
 a Blu-Ray disc player;
 a player;
 a tablet (or tablet computer);
 a laptop;
 a display;
 a camera and
 a decoding chip.

According to a fourth aspect, a device for generating a fourth color transform wherein the fourth color transform transforms an original picture into a target color graded version of the original picture is disclosed. The device comprises a processor configured to obtain a first color transform and a second color transform; obtain a third color transform (exemplary) wherein the third color transform transforms the original picture to the target color graded version of the original picture; and obtain at least one interpolating parameter wherein the fourth color transform is close to the exemplary third color transform and the fourth color transform is obtained by applying a parametric function determined by the at least one interpolating parameter to the first color transform and the second color transform.

In a variant, a device is disclosed that comprises means for obtaining the first color transform, the second color transform, and the third color transform and means for obtaining at least one interpolating parameter for the fourth color transform for instance by minimizing of an error between the third color transform and the fourth color transform.

According to a fifth aspect, a computer program product comprising program code instructions to execute the steps of any of the disclosed methods when this program is executed on a computer is disclosed.

According to a sixth aspect, a processor readable medium is disclosed that has stored therein instructions for causing a processor to perform at least the steps of any of the disclosed methods.

According to a seventh aspect, a non-transitory program storage device is disclosed that is readable by a computer, tangibly embodies a program of instructions executable by the computer to perform any of the disclosed methods.

While not explicitly described, the present embodiments may be employed in any combination or sub-combination. For example, the invention is not limited to the described color transform and any adjustable parametric function can be used for interpolation purpose.

Besides, any characteristic or embodiment described for the methods is compatible with a device intended to process the disclosed method and with a computer-readable storage medium storing program instructions.

4. BRIEF SUMMARY OF THE DRAWINGS

Other characteristics and advantages of the invention will appear through the description of a non-limiting embodiment of the present principles, which will be illustrated, with the help of the enclosed drawings.

5. DETAILED DESCRIPTION

A color gamut is a certain complete set of colors. The most common usage refers to a set of colors which can be accurately represented in a given circumstance, such as within a given color space or by a certain output device.

A color gamut is often defined by a color space and its dynamic range (i.e. min/max luminance) of the values, or coordinates, represented in the color space. A color space may further be specified by color primaries and by the reference white. An example of such a color space is RGB BT.2020 with D65 reference white and with minimum values equal to 0 and maximum values equal to 1. In this case, the values are relative values. RGB BT.709 with D65 reference white and with minimum values equal to 0 and maximum values equal to 1 is another example of such a color space. When working with a relative color space, for example BT.709, and a display having an absolute peak luminance, for example 100 cd/m$^2$, a relative luminance of BT.709, calculated from a weighted sum of R, G, and B color values according to BT.709, is multiplied by 100 resulting in an absolute luminance in the range from 0 cd/m$^2$ to 100 cd/m$^2$. Viewing conditions include additional characteristics such as absolute maximum display luminance (in cd/m$^2$), CIE 1931 x,y chromaticities of the background and/or surround of the display, the viewing distance and the viewing angle of the observer. According to the present principles, a color transform adapted to absolute luminance of a display of 1000 cd/m$^2$ is advantageously interpolated from a color transform adapted to absolute luminance of a display of 2000 cd/m$^2$ and a color transform adapted to absolute luminance of a display of 100 cd/m$^2$, where the parameters of the interpolation function are guided by another reference color transform adapted to absolute luminance of a display of 1000 cd/m$^2$. Color transform for 100 cd/m$^2$ and color transform for 2000 cd/m$^2$ are for instance advantageously transmitted as metadata to a distant receiver implementing the method and connected to a display of 100 cd/m$^2$. Advantageously, once the parameters are obtained, the another reference color transform adapted to absolute luminance of a display of 1000 cd/m$^2$ is removed from production thus reducing the storage of dedicated transform.

Figure 1:
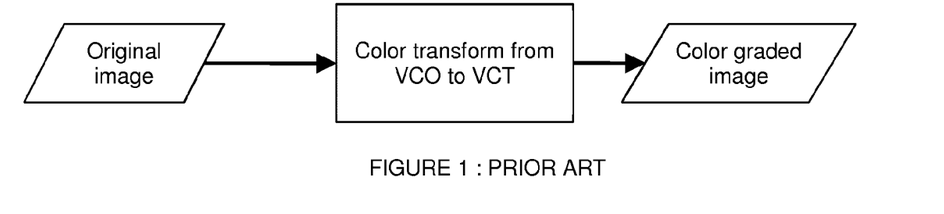
FIG. 1 depicts a color grading transform according to prior art.

FIG. 1 depicts a color grading transform. A color graded image adapted to specific target viewing conditions VCT is obtained from an original color image adapted to be shown under original viewing conditions VCO by applying a color transform. This color transform can be generated by manual or automatic tuning of a color processing applicator such as a gamut mapping, or a tone mapping. The gamut mapping operator is any known gamut mapping algorithm, for example Morovic and Luo review some algorithms is their paper entitled "The Fundamentals of Gamut Mapping: A Survey" and published in the Journal of Imaging Science and Technology in 2001 while the color gamut can be described using a Gamut Boundary Description using the Gamut ID format standardized by the IEC in IEC 61966-12-1 standard. The tone mapping operator mainly modifies the intensity and only slightly the hue and/or saturation of the original colors. The tone mapping operators are adapted to viewing conditions that differ mainly by the maximum display luminance. Tone mapping algorithms described by Erik Reinhard in his book (chapter 6) entitled "High dynamic range imaging" are compatible with the present principles. According to further non-limiting examples, such color transform is implemented as a LUT, a matrix or a mathematical function. For instance, according to another variant of tone mapping, an original luminance is obtained according to $$L_O = 0.2627 R_0 + 0.6780 G_0 + 0.0593 B_0$$

from an original color having the color coordinates $R_0$, $G_0$, $B_0$, a reference luminance $L_R$ of the color graded version for 2000 cd/m$^2$ is obtained according to $$L_R = 0.2627 R_{2000} + 0.6780 G_{2000} + 0.0593 B_{2000}$$

from an existing color having the color coordinates $R_{2000}$, $G_{2000}$, $B_{2000}$, and a target luminance $L_T$ of the color graded version for 1000 cd/m$^2$ is obtained according to $$L_T = 0.2627 R_T + 0.6780 G_T + 0.0593 B_T$$

from an existing color having the color coordinates $R_T$, $G_T$, $B_T$.

In this variant of tone mapping, a color transform is based on a single coefficient. For example, the reference color transform is $$R_R = L_R/L_0 \times R_0$$

$$G_R = L_R/L_0 \times G_0$$

$$B_R = L_R/L_0 \times B_0$$

and its coefficient is $L_R/L_O$. The target color transform is $$R_T = L_T/L_0 \times R_0$$

$$G_T = L_T/L_0 \times G_0$$

$$B_T = L_T/L_0 \times B_0$$

and its coefficient is $L_T/L_O$. An interpolated color transform is used at the receiver distant from the production according to:

$$R_I = L_I/L_0 \times R_0$$

$$G_I = L_I/L_0 \times G_0$$

$$B_I = L_I/L_0 \times B_0$$

having a coefficient is $L_I/L_O$. This coefficient of the interpolated color transform is calculated from a luminance $L_I$ that is interpolated using the following interpolation function:

$$L_I = f(L_R, L_O)$$

The interpolation function can be linear, for example:

$$L_I = aL_R + bL_O + c$$

Where the interpolation parameters a, b, c are determined at production using linear regression such that the remaining error $$\min_{a,b,c}(f(L_R, L_O) - L_T)^2$$

is minimal. Thus according to present principles, interpolation parameters a, b, c are transmitted to a receiver instead of the transform represented by its coefficient $L_I/L_O$. The skilled in the art will appreciate that the reference transform might be much more complex than is this exemplary embodiment and the gain is all the more important. Anyway, the way the color graded version and reference transforms are obtained and the form of the reference transform are out of the scope of the present disclosure.

Let assume that 3 different colors graded versions, associated with 3 color graded transforms are available at production or distribution side. The three reference color graded versions are obtained by any of the previously described method.

Figure 2:
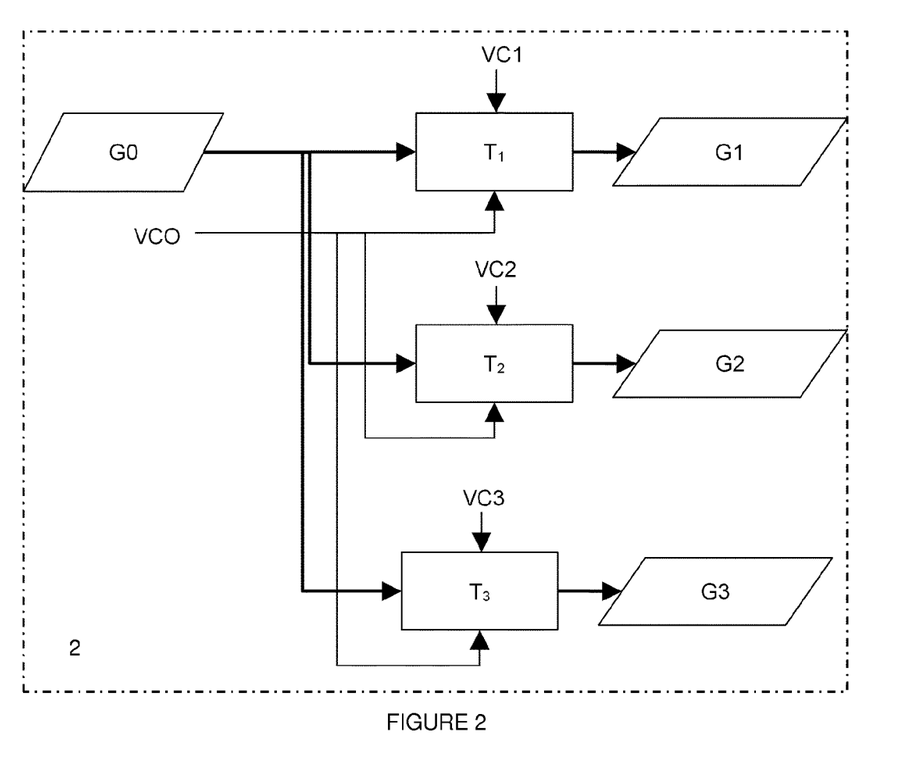
FIG. 2 is a schematic view of a device storing 3 color graded versions and 3 color grading transforms of a same original image according to an exemplary and non-limiting embodiment.

FIG. 2 is a schematic view of a device storing the three color graded versions from three color grading transforms of a same original image according to an exemplary and non-limiting embodiment. The device 2 comprises an input configured to obtain an original version G0 of at least a picture. The device 2 further comprises an input configured to respectively obtain a first color graded version G1, a second color graded version G2 and a third color graded version G3 of at least a picture by applying a first color transform $T_1$, a second color transform $T_2$ and a third color transform $T_3$ to the original version G0 of the picture. Each version is different from the others color graded versions. As an example, the three color graded versions have been created on the production side and are adapted to two different viewing conditions respectively VC1, VC2 and VC3, such as absolute luminance of a display of 2000 cd/m$^2$, 100 cd/m$^2$ and 1000 cd/m$^2$. As previously discussed, the viewing conditions may not only include the display on which the color graded version is rendered but also the environment of the display and the environment of the user. The environment for example comprises the surround and the background of the display. The environment of the user includes for example the distance between user and display. According to a particular characteristic, the viewing conditions comprise at least one of:
- display maximum luminance;
- display minimum luminance;
- display color gamut;
- environment maximum luminance;
- environment mean luminance;
- environment dominant color;
- user viewing distance;
- user viewing angle.

The first color transform $T_1$, the second color transform $T_2$ and the third color transform $T_3$ to apply to an original picture as well as associated viewing conditions may be obtained from a source. According to different embodiments of the invention, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

The device 2 may store color transforms $T_1$, $T_2$ and $T_3$ for each viewing condition, and may further store color graded versions G1, G2 and G3 for each viewing condition as shown on FIG. 2. According to the present principles, only a sub-set of the color transforms is needed, for instance the first and second ones, $T_1$, $T_2$, to obtain color transforms for each viewing condition.

Figure 3:
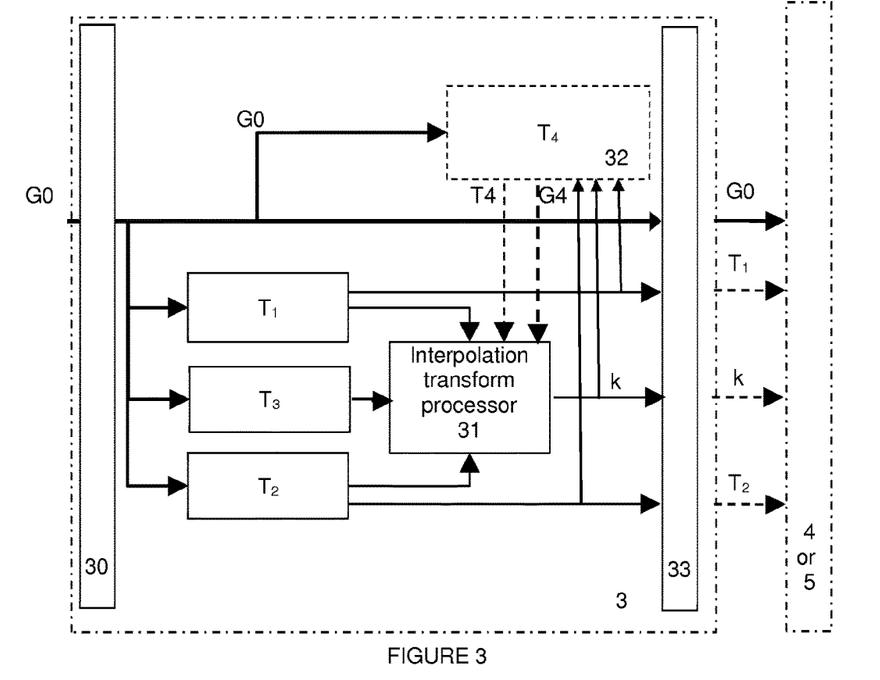
FIG. 3 is a schematic view of a device for generating a fourth color transform for obtaining a target color graded version of an original image from an interpolation of a first color transform and a second color transform according to an exemplary and non-limiting embodiment.

FIG. 3 is a schematic view of a device for generating a fourth color transform for obtaining a target color graded version of an original image from an interpolation of a first color transform and a second color transform according to an exemplary and non-limiting embodiment. The device 3 comprises an input 30 configured to obtain an original version G0 of at least a picture. The device 3 further comprises modules (memory or dedicated hardware) configured for storing a first color transform $T_1$, a second color transform $T_2$ and a third color transform $T_3$. Each transform is different from the other color transforms. As with previous example, the three color graded versions and respective color transforms $T_1$, $T_2$ and $T_3$ have been created on the production side and are adapted to different viewing conditions. The first color transform $T_1$, the second color transform $T_2$ and the third color transform $T_3$ as well as associated viewing conditions may be obtained through the input 30 from a source. According to different embodiments of the invention, the source belongs to a set comprising:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

The modules storing $T_1$, $T_2$, $T_3$ are linked to an interpolation transform processor 31. The processing of the interpolation transform processor 31 is described hereafter with respect to the method of FIG. 5. The interpolation transform processor 31 is linked to a module 32 configured to obtain the fourth color transform $T_4$ and apply the obtained color transform $T_4$ to the original image G0 to generate the fourth color graded version G4 from the interpolation parameters k, and a sub-set $T_1$ and $T_2$ of color transforms. The interpolation transform processor 31 outputs interpolation parameters k such that $T_4$ is an estimation of $T_3$ and such that $T_4$ obtained by a parametric function, called interpolation function, applied to $T_1$ and $T_2$ is controlled by parameters k.

Given the complexity of the interpolation function, an iterative process is optionally performed by the interpolation transform processor 31. In such variant, the color transform $T_4$ generated in module 32 is send back to the interpolation transform processor 31 for assessment. In yet another variant, the color graded version G4 obtained from $T_4$ is used in the iterative loop and also send back to the interpolation transform processor 31. The module 32 is linked to an output 33. The fourth color graded version G4 can be stored in a memory or can be sent (not shown) to a display 5. Thus according to a variant, both the interpolation function and the color graded version are generated in a same device. Advantageously, such a device is a high-end post-production computer or an end-user mobile implementing some image processing tool. Besides, once parameters k (for obtaining $T_4$ from a parametric function and a sub-set of transforms $T_1$ and $T_2$) are stored or/and output, the reference color transform $T_3$ is removed from memory. As an example, the first color transform $T_1$, the second color transform $T_2$ and parameters k are stored in a remote or in a local memory, e.g. a video memory or a RAM, a hard disk. In another variant, the first color transform $T_1$, the second color transform $T_2$ and interpolation parameters k are sent to a distant receiver 4 by means of a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

Indeed, the interpolation of $T_4$ using $T_1$ and $T_2$ allows us to not use and/or not save and/or not transmit the given third color transform $T_3$ while yielding in a fourth transformed video G4 being close to a third transformed video G3 that could have been obtained applying the third color transform $T_3$ to the original video. The fourth transformed video G4 is close to a third transformed video G3 because the interpolated transform $T_4$ is generally close to the transform $T_3$.

Figure 4:
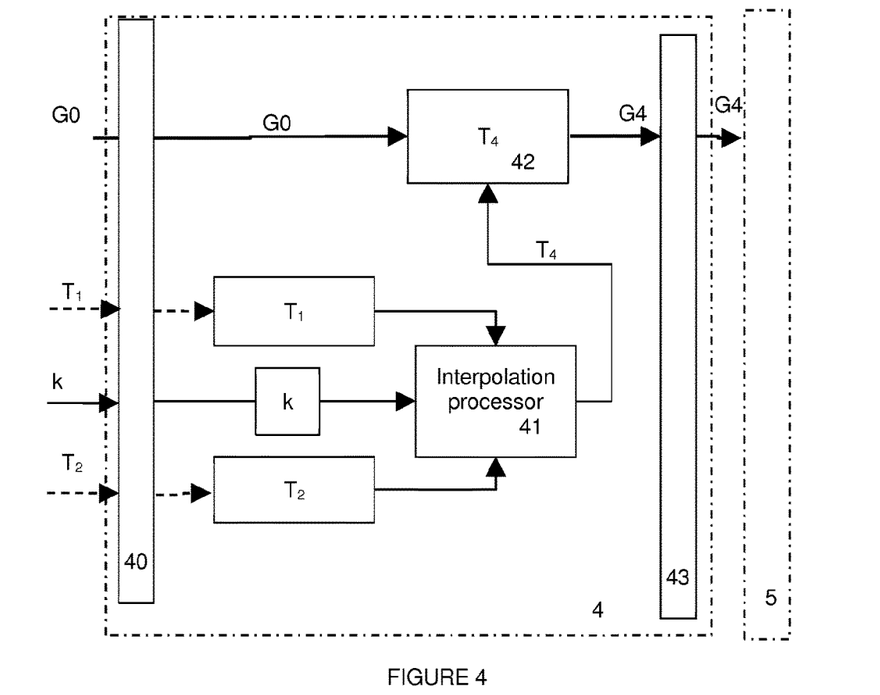
FIG. 4 is a schematic view of a device for obtaining a target color graded version of an original image from an interpolation of a first color transform and a second color transform according to an exemplary and non-limiting embodiment.

FIG. 4 is a schematic view of a device for obtaining a target color graded version of an original image from an interpolation of a first color transform and a second color transform according to an exemplary and non-limiting embodiment. The device 4 comprises an input 40 configured to obtain an original version G0 of at least a picture. The device 3 further comprises modules configured for storing a first color transform $T_1$, a second color transform $T_2$ and interpolation parameters k. As with previous example, the sub-set of reference color transforms $T_1$ and $T_2$ are created on the production side and are adapted to different viewing conditions. The first color transform $T_1$, the second color transform $T_2$ and interpolation parameters k may be obtained through the input 40 from a source. According to different embodiments of the invention, the source belongs to a set comprising:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

The modules storing $T_1$, $T_2$, k are linked to an interpolation processor 41. The processing of the interpolation transform processor 41 generating the color transform $T_4$ is described hereafter with respect to the method of FIG. 6. The interpolation processor 41 is linked to a module 42 configured to apply the color transform $T_4$ to the original image G0 resulting into the fourth color graded version G4. The module 42 is linked to an output 43. The third color G4 can be stored in a memory or can be sent to a display 5. Indeed, the interpolation of $T_4$ using $T_1$, $T_2$ guided by interpolation parameters k allows to not use and/or not save and/or not transmit the given third color transform $T_3$ while yielding in a fourth transformed video G4 being close to a third transformed video G3 that could have been obtained applying the third color transform $T_3$ to the original video.

Figure 5:
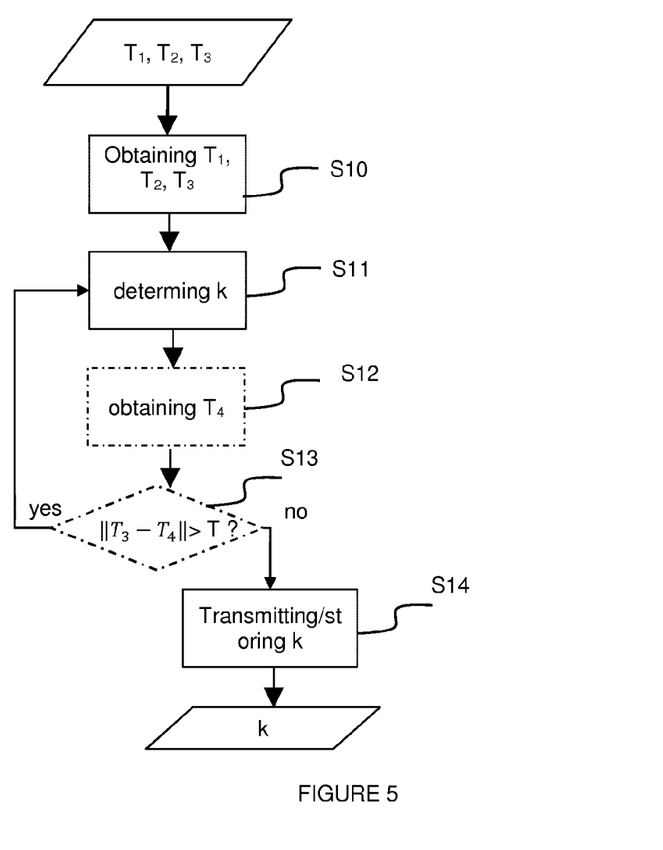
FIG. 5 represents a flowchart of a method for generating a color transform by interpolation according to an exemplary and non-limiting embodiment.

FIG. 5 represents a flowchart of a method for generating a color transform by interpolation according to an exemplary and non-limiting embodiment. Such method is implemented in the interpolation transform processor of a device 3. In a first preliminary step S10, the color transforms $T_1$, $T_2$ used as reference transforms and color transform $T_3$ used as exemplary transform for guiding the interpolation are obtained, for example, from a source. The way these exemplary transforms are generated is out of the scope of the present principles.

In a step S11, at least an interpolation parameter k is determined such that a parametric interpolation function applied to the first color transform $T_1$ and the second color transform $T_2$ results into a fourth color transform $T_4$ being an estimation (or approximation, in other word close to) of the third color transform $T_3$. Advantageously, the interpolation of $T_4$ is not blind but is driven by the exemplary third color transform $T_3$. Thus the interpolation of $T_4$ allows to not use and/or not save and/or not transmit the given exemplary third color transform $T_3$ while providing information for generating a fourth transformed video G4 being close to a third transformed video G3 that could have been obtained applying the third color transform $T_3$ to the original video G0. Indeed, only the interpolation function, for instance represented by parameters of a parametric model, and the sub-set of reference transforms $T_1$, $T_2$ are stored. The third color transform $T_3$ used to obtain the interpolated fourth color transform $T_4$ is no longer needed can be removed from storage.

According to a first variant, the function used in the interpolation is a linear function parametrized by a coefficient k with $0<k<1$ where $$T_4 = kT_1 + (1-k)T_2 \qquad \text{eq(1)}$$

In this first variant, a single color transform interpolation parameter k is determined. If $C_i$ with $0 \leq i < I$ are sample color values equally distributed over the color space, the following interpolation error $$\Sigma_i [T_3(C_i) - kT_1(C_i) - (1-k)T_2(C_i)]^2 \qquad \text{eq(2)}$$

is minimized during step S11. The minimum error is achieved when the following equation is satisfied:

$$\Sigma_i T_3(C_i) - T_2(C_i) + k\Sigma_i T_2(C_i) - T_1(C_i) = 0 \qquad \text{eq(3)}$$

leading to the interpolation parameter $$k = \frac{\sum_i T_2(C_i) - T_3(C_i)}{\sum_i T_2(C_i) - T_1(C_i)} \qquad \text{eq (4)}$$

According to a second variant, the function used in the interpolation is a polynomial function parametrized by 4 coefficients $k_i$ with $0<k_i<1$ and $i=1, 2, 3, 4$ where $$T_4 = k_1 T_1 + k_2 T_1^2 + k_3 T_2 + k_4 T_2^2 \qquad \text{eq(5)}$$

According to a another variant, the function used in the interpolation is a non-linear function parametrized by 2 coefficients $k_i$ with $0<k_i<1$ and $i=1, 2$, where $$T_4 = k_1 \ln T_1 + k_2 \ln T_2 \qquad \text{eq(6)}$$

However, any function is compatible with the present principles such as non-linear, parametric functions, splines or look up tables. As for the linear interpolation function, such function is calculated such that min $D(f(T_1,T_2),T_3)$ with $D(\ )$ being a distance, norm, or interpolation error function. The interpolation function, for instance represented by its color transform interpolation parameters k, is determined by minimizing the interpolation error on sample color values $C_i$ with $0 \le i < I$:

$$\Sigma_i [T_3(C_i) - f(T_1, T_2)(C_i)]^2 \qquad \text{eq(7)}$$

In an optional step S12, once the interpolation function is determined, the color transform itself $T_4$ is calculated by applying the interpolation function to $T_1$ and $T_2$ using the parametric model and the at least one interpolation parameter k. In the first variant, $T_4$ is obtained according to:

$$T_4 = kT_1 + (1-k)T_2.$$

In another optional step S13, $T_3$ and $T_4$ are compared. Advantageously the comparison allows verifying the error in the minimization process of step S11. In case, the error in the interpolated color transform $T_4$ is too large, the determining step S11 is re-iterated. According to a non-limiting example, the error $\varepsilon$ or the function $D(\ )$ is the sum of squared differences (also known as L2 norm) is computed between $T_3$ and $T_4$ for a set of sample color values $C_i$ with $0 \le i < I$.

$$\varepsilon = \|T_3 - T_4\| = \Sigma_i [T_3(C_i) - T_4(C_i)]^2 \qquad \text{eq(8)}$$

If the error $\varepsilon$ is larger than a predefined threshold T, the determining step S11 is repeated to determine an updated parameter k. Else, if the error $\varepsilon$ is not larger than the predefined threshold T, the method goes to step S14.

According to different variants, the set of samples colors used to assess the error is the same as in the determining step S11 or a different one, for instance larger than the one used in determining step S11. In a variant of the optional step S13, the error $\varepsilon$ is computed considering color preferences indicating—for at least one color—the importance of colors for difference calculations. To that end, a weighted difference is computed between $T_3$ and $T_4$ for a set of sample color values $C_i$ with $0 \le i < I$ where $w_i$ with $0 \le i < 1$ is the relative weight representative of the importance of the sample color i $$\varepsilon = \Sigma_i w_i [T_3(C_i) - T_4(C_i)]^2 \qquad \text{eq(9)}$$

Again, if the error $\varepsilon$ is larger than a predefined threshold T, the determining step S11 is re-iterated.

According to another non-limiting example, an assessment of the error $\varepsilon$ between $T_3$ and $T_4$ is obtained by a difference of their respective color graded images G3 and G4. To that end, the fourth color transform is applied to an original image G0 resulting into the fourth color graded image G4. The third color transform is also applied to the original image G0 resulting into the third color graded image G3. Then, the image difference is computed through a SAD for at least a subset of pixel color values $X_i$ of the original image with i being the number of the at least a subset of pixels in the original image:

$$\varepsilon = \|T_3 - T_4\| = \Sigma_i [T_3(X_i) - T_4(X_i)]^2 \qquad \text{eq(10)}$$

In yet another variation, the image difference is computed considering image preferences indicating—at least for one spatial part of the image—the importance of spatial image parts for image difference calculation.

$$\varepsilon = \|T_3 - T_4\| = \Sigma_i w_i [T_3(X_i) - T_4(X_i)]^2 \qquad \text{eq(11)}$$

Of course, the present principles are compatible with other difference computation such as the sum of absolute difference (also known as norm L1).

Finally, in a step S14 compliant with the variant where color transform is performed in a distant receiver, the parameter k of the parametric model of the interpolation function is transmitted to the distant receiver already storing the two color transforms $T_1$ and $T_2$.

It is preferable that the interpolation function is of simple complexity, such as with a linear function, to reduce computational effort for calculation of the interpolation parameter. However, the present principles are well adapted with complex color transforms since any color transform is adaptively generated based on a subset of color transforms, in a preferred embodiment 2 color transforms, and the parametric interpolation function. In this case, the gain of transmitting k rather than complex color transform such as nonlinear function or implemented as a LUT, is particularly advantageous.

Figure 6:
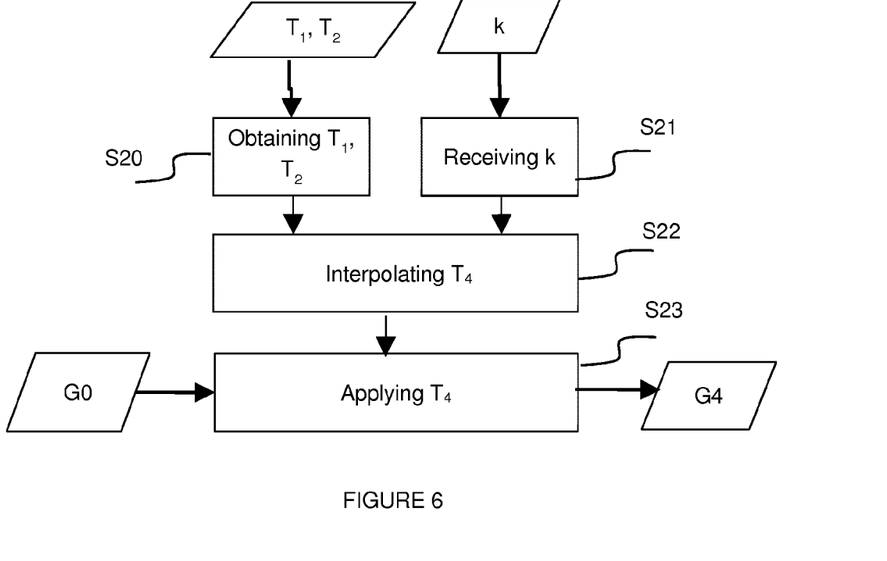
FIG. 6 represents a flowchart of a method for generating a target color graded version from an interpolated color transform according to an exemplary and non-limiting embodiment.

The method implemented at the distant receiver is now described. FIG. 6 represents a flowchart of a method for generating a target color graded version from an interpolated color transform according to an exemplary and non-limiting embodiment. Such method is implemented in the interpolation transform processor of device 4. In a first preliminary step S20, the subset of color transforms $T_1$ and $T_2$ used as reference transforms for generating the interpolated transform are obtained, for example, from a source. For instance, the subset of color transforms $T_1$ and $T_2$ are transmitted as metadata (color related information) to the device 4. The way these exemplary transforms are obtained is out of the scope of the present principles.

In a step S21, at least an interpolation parameter k is received from a device 3 for generating a fourth color transform based on a sub-set of reference transform and corresponding to an exemplary third color transform $T_3$ (only known from the device 3 which generates the interpolation parameter k). The interpolation parameter, in any of its variants describe with FIG. 4, determines a parametric function of the device 4.

In a step S22, a fourth color transform $T_4$ is interpolated by applying the parametric function determined by the interpolation parameter(s) k to the first color transform $T_1$ and the second color transform $T_2$. The interpolated fourth color transform $T_4$ is an estimation of a third color transform $T_3$.

Then in a step S23, the fourth color transform $T_4$ is applied to an original image G0 resulting into the fourth color graded image G4. G4 and G3 are color graded version of the original image G0 corresponding to same viewing conditions. Advantageously, G4 is obtained without transmitting or storing the reference third color transform $T_3$ to the device 4. The skilled in the art will appreciate that by receiving new parameters k, the device 4 is adapted to changing viewing conditions without transmitting dedicated color transforms.

Figure 7:
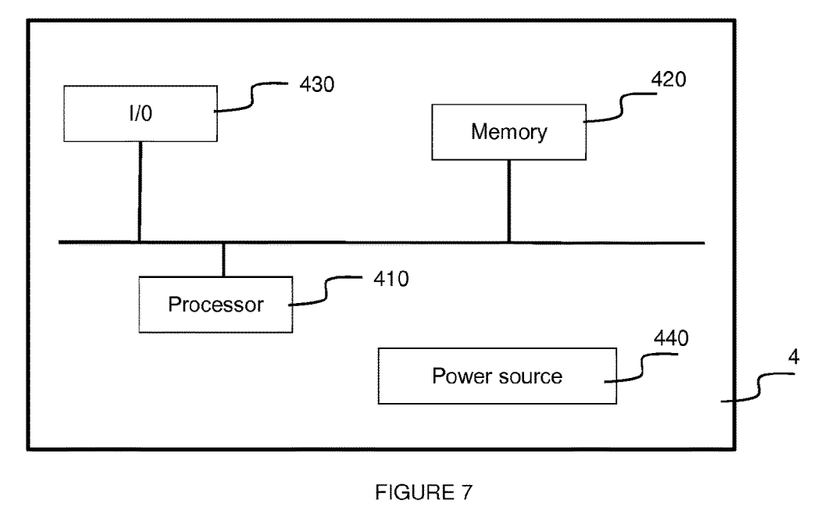
FIG. 7 represents an exemplary architecture of a color grading device 4 according to an exemplary and non-limiting embodiment.

FIG. 7 represents an exemplary architecture of a color grading device 4 according to an exemplary and non-limiting embodiment. The color grading interpolation device 4 is configured to execute the method described with reference to FIG. 6. The skilled in the art will appreciate that the exemplary architecture is also suitable to execute the method described with reference to FIG. 5. The color grading interpolation device 4 comprises one or more processor(s) 410, which could comprise, for example, a CPU, a GPU and/or a DSP (English acronym of Digital Signal Processor), along with internal memory 420 (e.g. RAM, ROM and/or EPROM). The color grade interpolation device 4 comprises one or more Input/Output interface(s) 430, each adapted to display output information and/or allow a user to enter commands and/or data (e.g. a keyboard, a mouse, a touchpad, a webcam); and a power source 440 which may be external to the color grading interpolation device 4. The color grading interpolation device 4 may also comprise one or more network interface(s) (not shown). The 2 color transforms $T_1$ and $T_2$, the original image G0 as well as the parameters of the interpolation function may be obtained from a source and stored in the memory 420.

According to different embodiments, the fourth color graded version of the image may be sent to a destination, e.g. a display device. As an example, the fourth color graded version of the image is stored in a remote or in a local memory 420, e.g. a video memory or a RAM, a hard disk. In a variant, the fourth color graded version of the picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the color grading interpolation device 4 further comprises a computer program stored in the memory 420. The computer program comprises instructions which, when executed by the color grading interpolation device 4, in particular by the processor 410, enable the color grading interpolation device 4 to execute the method described with reference to FIG. 6 (or FIG. 5). According to a variant, the computer program is stored externally to the color grading interpolation device 4 on a non-transitory digital data support, e.g. on an external storage medium such as a HDD, CD-ROM, DVD, a read-only and/or DVD drive and/or a DVD Read/Write drive, all known in the art. The color grading interpolation device 4 thus comprises a mechanism to read the computer program. Further, the color grading interpolation device 4 could access one or more Universal Serial Bus (USB)-type storage devices (e.g., "memory sticks.") through corresponding USB ports (not shown). According to exemplary and non-limiting embodiments, the color grading interpolation device 4 can be, but not limited to:

a mobile device;
a communication device;
a game device;
a set top box;
a TV set;
a tablet (or tablet computer);
a laptop;
a video player, i.e. a Blu-Ray disc player;
a display;
a camera; and
a decoding chip.

The color grade interpolation device 2 is advantageously part of a player 300 or of a TV set.

Figure 8:
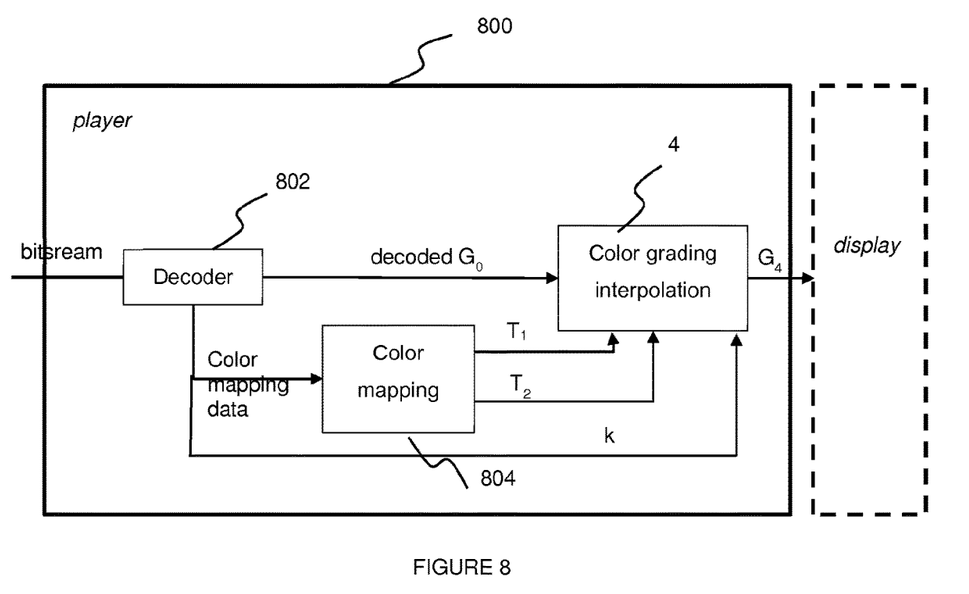
FIG. 8 represents a player 800 according to an exemplary and non-limiting embodiment.

FIG. 8 represents a player 800 implementing a color grading interpolation device 4 according to an exemplary and non-limiting embodiment. The player 800 receives an input a bitstream. The input is connected a decoder 802 which is in turn connected to a color mapping circuit 804. The color mapping circuit 804 outputs the color transforms T1 and T2 derived from the Color mapping data. The decoder 802 is configured to decode the original color graded version of the picture, decoded G0, and the color mapping data. The color mapping circuit 804 is configured to derive and store a first color transform for instance corresponding to luminance of a display of 2000 $cd/m^2$ and a second color transform for instance adapted to luminance of a display of 100 $cd/m^2$. Outputs of the color mapping circuit 804 and one output of the decoder 802 are connected on inputs of a color grading interpolation device 4. The color grading interpolation device 4 is configured to execute the method described with reference to FIG. 6. The color grade interpolation device 4 generates the fourth color transform, for instance adapted to luminance of a display of 1000 $cd/m^2$, from parameters k of an interpolation function received as additional color mapping data. Then the fourth color graded version of the picture is obtained from the decoded original color graded version responsive to the color mapping data (reference transforms and interpolation parameter). The output of the color grading interpolation device 4 is connected on an output of the player 800. In a specific embodiment, the player 800 comprises one or more processor(s), which could comprise, for example, a CPU, a GPU and/or a DSP (English acronym of Digital Signal Processor), along with internal memory (e.g. RAM, ROM and/or EPROM). The player 800 comprises one or more Input/Output interface(s), each adapted to display output information and/or allow a user to enter commands and/or data (e.g. a keyboard, a mouse, a touchpad, a webcam); and a power source which may be external to the player 800. The player 800 may also comprise one or more network interface (s) (not shown).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of generating a target color graded version of an original picture from a first color transform and a second color transform, the method comprising:
    applying the first color transform to transform the original picture into a first color graded version of the original picture;
    applying the second color transform to transform the original picture to a second color graded version of the original picture;
    receiving at least one interpolating parameter such that a fourth color transform is obtained by applying a parametric function determined by the at least one interpolating parameter to the first color transform and to the second color transform, wherein the at least one interpolating parameter is obtained by minimizing an error between a third color transform and the fourth color transform, and wherein the third color transform transforms the original picture into the target color graded version of the original picture;
    generating the fourth color transform by an interpolation that applies the parametric function determined by the at least one interpolating parameter to the first color transform and to the second color transform; and
    generating the target color graded version of the original picture by applying the fourth color transform to the original picture.

2. A method of generating a fourth color transform, wherein the fourth color transform transforms an original picture into a target color graded version of the original picture, the method comprising:
    obtaining a first color transform, wherein the first color transform transforms the original picture into a first color graded version of the original picture;
    obtaining a second color transform, wherein the second color transform transforms the original picture to a second color graded version of the original picture;
    obtaining a third color transform, wherein the third color transform transforms the original picture to the target color graded version of the original picture;
    obtaining at least one interpolating parameter, wherein the fourth color transform is obtained by applying a parametric function determined by the at least one interpolating parameter to the first color transform and the second color transform, the at least one interpolating parameter being obtained by minimizing an error between the third color transform and the fourth color transform.

3. The method according to claim 2, further comprising calculating the fourth color transform by an interpolation that applies the parametric function determined by the at least one interpolating parameter to the first color transform and the second color transform.

4. The method according to claim 2, further comprising transmitting the first color transform, the second color transform and the at least one interpolating parameter.

5. The method according to claim 2, further comprising:
    obtaining a difference between the third color transform and the fourth color transform for a set of sample color values;
    and when the difference is above a value, repeating obtaining the at least one interpolating parameter.

6. A device comprising a processor and a memory having stored instructions operative, when executed by the processor, to cause the device to generate a target color graded version of an original picture, and to further cause the device to:
    obtain a first color transform and a second color transform, wherein the first color transform transforms the original picture into a first color graded version of the original picture, and wherein the second color transform transforms the original picture to a second color graded version of the original picture;
    receive at least one interpolating parameter such that a fourth color transform is obtained by applying a parametric function determined by the at least one interpolating parameter to the first color transform and the second color transform, wherein the at least one interpolating parameter is obtained by minimizing an error between a third color transform and the fourth color transform, and wherein the third color transform transforms the original picture into the target color graded version of the original picture;
    generate the fourth color transform by an interpolator that applies the parametric function determined by the at least one interpolation parameter to the first color transform and the second color transform; and
    generate the target color graded version of the original picture by applying the fourth color transform to the original picture.

7. The device according to claim 6, wherein the device is selected from a group consisting of:
    a mobile device;
    a communication device;
    a game device;
    a set top box;

a TV set;

a Blu-Ray disc player;

a player;

a tablet (or tablet computer);

a laptop;

a display;

a camera; and a decoding chip.

8. A device comprising a processor and a memory having stored instructions operative, when executed by the processor, to cause the device generate a fourth color transform, wherein the fourth color transform transforms an original picture into a target color graded version of the original picture, and to further cause the device to:

obtain a first color transform, wherein the first color transform transforms the original picture into a first color graded version of the original picture;

obtain a second color transform, wherein the second color transform transforms the original picture to a second color graded version of the original picture;

obtain a third color transform, wherein the third color transform transforms the original picture to the target color graded version of the original picture; and obtain at least one interpolating parameter, wherein a fourth color transform is obtained by applying a parametric function determined by the at least one interpolating parameter to the first color transform and the second color transform, the at least one interpolating parameter being obtained by minimizing an error between the third color transform and the fourth color transform.

9. The device according to claim 8, wherein the instructions further cause the device to calculate the fourth color transform by an interpolation that applies the parametric function determined by the at least one interpolating parameter to the first color transform and the second color transform.

10. The device according to claim 8, wherein the instructions further cause the device to transmit the first color transform, the second color transform and the at least one interpolating parameter.

11. The device according to claim 8, wherein the instructions further cause the device to:

obtain a difference between the third color transform and the fourth color transform for a set of sample color values;

and when the difference is above a value, repeat obtaining the at least one interpolating parameter.

12. A non-transitory processor-readable storage medium having stored instructions that, when executed by a processor, cause the processor to:

apply a first color transform to transform an original picture into a first color graded version of the original picture;

apply a second color transform to transform the original picture to a second color graded version of the original picture;

receive at least one interpolating parameter such that a fourth color transform is obtained by applying a parametric function determined by the at least one interpolating parameter to the first color transform and to the second color transform, wherein the at least one interpolating parameter is obtained by minimizing an error between a third color transform and the fourth color transform and wherein the third color transform transforms the original picture into a target color graded version of the original picture;

generate the fourth color transform by an interpolation that applies the parametric function determined by the at least one interpolating parameter to the first color transform and to the second color transform; and generate the target color graded version of the original picture by applying the fourth color transform to the original picture.

\* \* \* \* \*

UNITED STATES PATENT AND TRADEMARK OFFICE
CERTIFICATE OF CORRECTION

PATENT NO. : 11,037,524 B2
APPLICATION NO. : 16/470214
DATED : June 15, 2021
INVENTOR(S) : Jurgen Stauder, Patrick Morvan and Corinne Poree It is certified that error appears in the above-identified patent and that said Letters Patent is hereby corrected as shown below:

In the Claims

Claim 6, Column 16, Line 57: replace "interpolation" with --interpolating--.

Signed and Sealed this
Second Day of August, 2022

Katherine Kelly Vidal
*Director of the United States Patent and Trademark Office*